US006911646B1

(12) United States Patent
Weitekamp

(10) Patent No.: US 6,911,646 B1
(45) Date of Patent: Jun. 28, 2005

(54) MEASUREMENTS OF ELECTROMAGNETIC PROPERTIES AND INTERACTIONS BASED ON RADIATION-EXCITED POLARIZATIONS

(75) Inventor: Daniel P. Weitekamp, Altadena, CA (US)

(73) Assignee: California Institute of Technology, Passadena, CA (US)

( * ) Notice: Subject to any disclaimer, the term of this patent is extended or adjusted under 35 U.S.C. 154(b) by 0 days.

(21) Appl. No.: 09/576,654

(22) Filed: May 22, 2000

Related U.S. Application Data

(60) Provisional application No. 60/135,244, filed on May 21, 1999.

(51) Int. Cl.[7] .................................................. H01J 3/14
(52) U.S. Cl. ...................................... 250/234; 250/225
(58) Field of Search ................................ 250/225, 234, 250/235, 216, 306–311; 73/105; 324/300

(56) References Cited

U.S. PATENT DOCUMENTS

| 4,982,088 | A |   | 1/1991 | Weitekamp et al. | ........ 250/291 |
| 5,619,139 | A | * | 4/1997 | Holczer et al.   | ........ 324/300 |
| 5,751,684 | A | * | 5/1998 | Takeda et al.    | ........ 250/306 |
| 6,085,580 | A | * | 7/2000 | Ludeke et al.    | ........ 250/306 |

OTHER PUBLICATIONS

Rugar et al., "Improved fiber–optic interferometer for atomic force microscopy," *Applied Physics Letters*. vol. 55, pp. 2588–2590, Dec. 18, 1989.

Walters et al. "Elastic starin of freely suspended single–wall carbonnanotube ropes," *Applied Physics Letters*. vol. 74, pp. 3803–3805, Jun. 21, 1999.

Leskowitz et al., "Observation of Force–Detected Nuclear Magnetic Resonance in a Homogenous Magnetic Field," Bulletin of the American Physical Soiety, vol. 44, pp. 543, (1999).

Nie et al., "Probing Single Molecules and Single Nanoparticles by Surface–Enhanced Raman Scattering," Science, vol. 275, pp. 1102–1106, Feb. 21, 1997.

Michaels et al., "Sufrace Enhanced Raman Spectroscopy of Individual Rhodamine 6G Molecules on Large Ag Nanocrystals," Journal of the American Chemical Society, vol. 121, No. 43, pp. 9932–9939, Nov. 3, 1999.

Gordon et al., "Motion of atoms in a radiation trap," Physical Review A, vol. 21, No. 5, pp. 1606–1617, May 1980.

Novotny et al., "Theory of Nanometric Optical Tweezers," Physical Review Letters, vol. 79, No. 4, pp. 645–648, Jul. 28, 1997.

Ashkin, "Forces of a Single–Beam Gradient Laser Trap on a Dielectric Sphere in the Ray Optics Regime," Methods in Cell Biology, vol. 55, pp. 1–27, 1998.

Pizarro et al., "Magnetic Resonance of Trapped Ions by Spin–Dependent Cyclotron Acceleration," Bulletin of Magnetic Resonance, vol. 14, No. 1–4, pp. 220–233, 1992.

Sidles, "Noninductive detection of single–proton magnetic resonance," Applied Physics Letters, vol. 58, No. 24, pp. 2854–2856, Jun. 17, 1991.

Sidles et al., "Magnetic resonance force microscopy," Reviews of Modern Physics, vol. 67, No. 1, pp. 249–265, Jan. 1995.

Leskowitz et al., "Force–detected magnetic resonance without field gradients," Solid State Nuclear Magnetic Resonance, vol. 11, pp. 73–86, 1998.

\* cited by examiner

*Primary Examiner*—Thanh X. Luu
(74) *Attorney, Agent, or Firm*—Fish & Richardson P.C.

(57) ABSTRACT

Techniques and systems using polarizable objects in sufficiently close proximity to measure the force of interaction between a sample and a probe to obtain information about the properties of the sample. One or more small mechanical oscillators with high force sensitivity are engaged to the sample or the probe for the measurements.

36 Claims, 2 Drawing Sheets

US 6,911,646 B1

MEASUREMENTS OF ELECTROMAGNETIC PROPERTIES AND INTERACTIONS BASED ON RADIATION-EXCITED POLARIZATIONS

This application claims the benefit of U.S. Provisional Application No. 60/135,244, filed on May 21, 1999.

BACKGROUND

This application relates to measurements of electromagnetic properties and interactions of various materials, and more specifically, to techniques and systems for measuring electromagnetic properties and interactions based on radiation-excited polarizations.

Various materials respond to an external radiation field, e.g., an electromagnetic irradiation, to develop electromagnetic polarization. The interaction between the induced polarization in a material and the radiation field can be measured or monitored to provide useful information for a variety of applications including, among others, imaging, spectroscopy, recording, and determination of distances and angles. Non-destructive measurements based on such interaction of high spatial resolution and detection sensitivity are particularly desirable. A number of techniques have been developed to meet such needs. Examples include the scanning tunneling microscope, atomic force microscope, and near-field scanning optical microscope.

Many of such techniques operate based on detection of electromagnetic emission from a sample under excitation of an external field. In incoherent spontaneous emission, the signal to be detected is essentially determined by the multiplication of the average excited state population and the rate of emission. In methods based on coherent emission, it is useful to describe the detection as being of those field modes into which the sample has radiated. In both cases, the detection sensitivity is generally limited by the quantum limit of the "shot noise" that is inherent in the detection.

SUMMARY

The present techniques and systems include a method of creating and detecting a force interaction between a sample and a probe to measure properties of the sample. A probe excitation field is generated to at the probe formed of a polarizable material. This produces a probe polarization. The sample with a sample polarization is placed in a field of the probe polarization effectuate an interaction between the probe and the sample. A mechanical oscillator is engaged to at least one of the probe and the sample and moves in response to said interaction. The motion of the oscillator is then detected and is used to measure a property of the sample.

DETAILED DESCRIPTION

Figure 1:
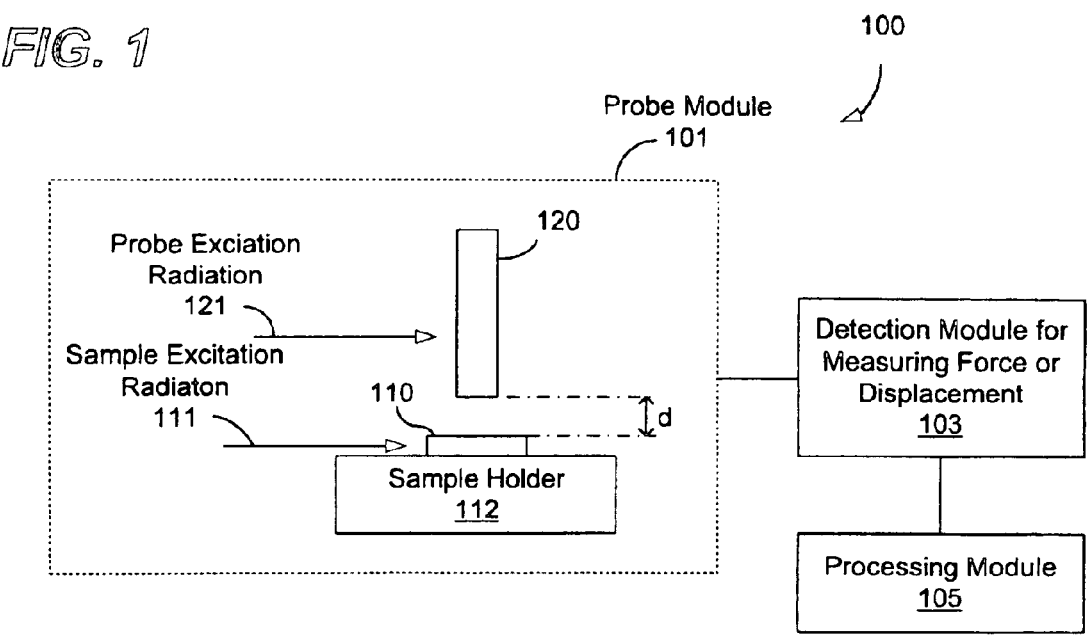
FIG. 1 shows one embodiment of a force-detected optical spectrometer.

FIG. 1 shows a system 100 having a probe module 101, a detection module 103, and a processing module 105 for measuring the electromagnetic properties and interaction of a sample 110 according to one embodiment. This system can operate as a force-detected optical spectrometer ("FDOS") to measure properties of the sample 110 or as an imaging device to produce an image of the sample 110. The probe module 101 includes a sample holder 112 to hold the sample 110 for measurement. A probe 120 is provided to interact with a desired location on the sample 110 through electromagnetic coupling. The force response of either the probe 120 or the sample 110 due to the interaction between the probe 120 and the sample 110 is then measured by the detection module 103. The processing module 105, which may include a microprocessor, then receives and processes the detection signal from the detection module 103 to produce useful information about the sample 110. The probe module 101 may also include a positioning mechanism such as a position scanner to control the relative position of the probe 120 with respect to the sample 110 so that different locations on the sample 110 can be measured. In addition, two or more probes may be implemented in the probe module 101 to measure different locations at the same time.

The probe 120 generally includes a material that can be polarized by an external probe excitation radiation 121, e.g., a metal or a dielectric. Hence, the polarization induced in the probe 120 can produce a radiation field to interact with the sample 110 by producing a force on the sample 110 and a counter force on the probe 120. The probe module 101 is designed to produce two mutually coherent excitation radiation waves 111 and 121 at two different frequencies. The sample excitation wave 111 at an angular frequency $\omega_s$ is used to excite a sample polarization in the sample 110 at the same frequency $\omega_s$. The angular frequency $\omega_p$ of the probe excitation wave 121 is generally different from $\omega_s$ and is used to excite a probe polarization in the probe 120 at the frequency $\omega_p$. One of the radiation waves 111 and 121 may be a static field (i.e., $\omega_s$ or $\omega_p$ is zero).

Hence, when the probe 120 is sufficiently close to the sample 110, the induced polarization in the sample 110 experiences a field produced by the induced polarization in the probe 120. Accordingly, this field produces a force on the sample 110. This force is a function of the frequencies $\omega_s$ and $\omega_p$ through the response of the sample and probe to the corresponding waves. In a first-order approximation, the force oscillates at the difference frequency $\omega_f = |\omega_p - \omega_s|$. Similarly, the induced polarization in the probe 120 experiences a field produced by the induced polarization in the sample 110 and experiences a force opposite in its direction to the force on the sample 110. The force on either the sample 110 or the probe 120 can be measured to determine the electromagnetic properties of the sample 110 and to produce an image of the sample 110.

The interaction force between the sample 110 and the probe 120 can be measured by a displacement of either the sample 110 or the probe 120 caused by the force. For example, when one of the sample 110 and the probe 120 is fixed and the other is engaged to a mechanical oscillator, the displacement of the oscillator will change in accordance with the interaction force. Hence, the amplitude of the oscillator can be measured to determine the electromagnetic properties of the sample 110. When the modulation frequency $\omega_f$ is tuned near the resonance frequency $\omega_h$ of the oscillator by adjusting either $\omega_s$ or $\omega_p$, the response of the oscillator becomes highly sensitive to the force and hence can be used to achieve high detection sensitivity. Therefore, the excitations of the sample 110 and the probe 120 at different frequencies provides a conversion mechanism to convert a material polarization signal at a high frequency $\omega_s$ into a low-frequency signal at $\omega_f = |\omega_p - \omega_s|$ within the frequency range of the mechanical oscillator. This is only one operation mode of the system 100. Other operation modes are also possible and are described below.

The induced polarizations in the sample 110 and the probe 120 may include any polarizations. The implementations of the probe module 101 and the detection module 103 may vary with the nature of the polarizations, such as electric or magnetic polarizations, dipolar or quadrupolar polarizations, or the dependence of the amplitude of the interaction force on various incident fields, e.g., a linear dependence on one or more incident field amplitudes. The force measurements may also include effects of elastic contributions which shift the frequency of the oscillator and of dissipative contributions which damp its motion.

The probe module 101 may operate in a near field configuration where the spacing between the sample 110 and the probe 120 is less than one wavelength of any of the radiation waves used. Hence, the sample 110 and the probe 120 are within each other's evanescent fields of the induced polarizations. This configuration provides a strong interaction between the sample 110 and the probe 120. In addition, this configuration can be used to achieve a spatial resolution higher than the spatial resolution in a far-field configuration where the spacing between the probe 120 and the sample 110 is much greater than one wavelength of any of the radiation waves involved. In particular, mechanical oscillators with one or more dimensions small compared to the free space wavelength of such radiation may be used in a near-field configuration.

This use of close proximity of polarizable objects increases their force of interaction. This proximity, combining with the use of small mechanical oscillators with high force sensitivity, allows sensitivity and spatial resolution that can be qualitatively better than many other spectroscopic methods. The ability to apply this force of interaction at chosen mechanical frequencies leads to advantages over methods in which the DC force is measured. The use of possibly different incident fields in sample and probe volumes and/or their different response to common incident fields allows separate optimization of each polarization and a great variety of modulation schemes. In addition to modulation of the incident fields in order to achieve a desired mechanical resonance, the properties of the sample, the probe and their geometry relative to one another or relative to other fields may also be modulated.

The calculation of the force on the oscillator follows from established principles of electromagnetism and its interaction with matter. By using polarizable probe material in close proximity to the sample, large gradients in the near field of matter can be achieved to enhance the interaction and the detection sensitivity.

Figure 2:
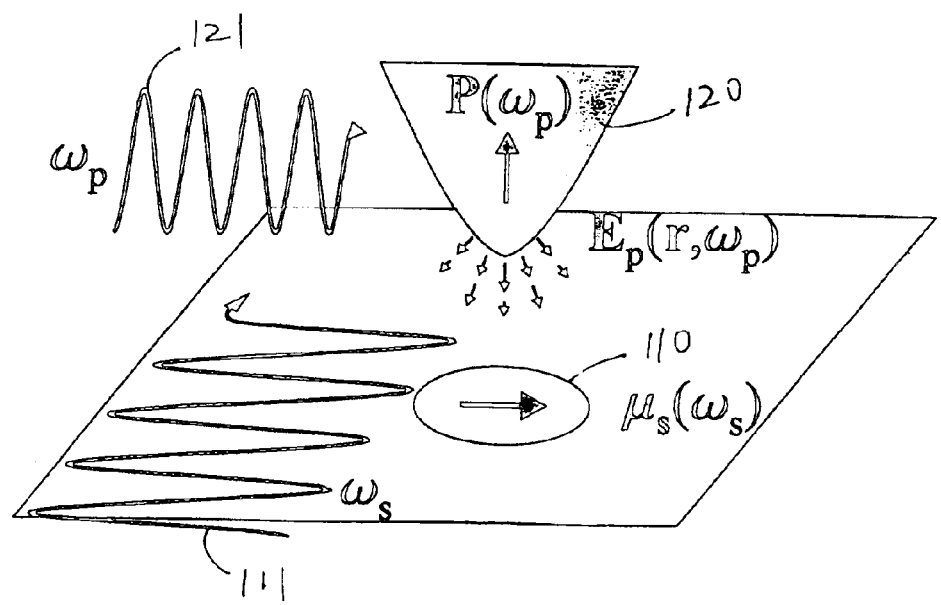
FIG. 2 shows one exemplary arrangement of the sample and the probe.

FIG. 2 illustrates one way of the exciting the sample 110 and the probe 120 with radiation waves when the contributions from electric-dipole transitions dominate the induced polarizations in both the sample 110 and the probe 120. The interaction energy H between the sample 110 and the probe 120 can be written as:

$$H = -\int \vec{E}_s \cdot \vec{P}_p dV_p = -\int \vec{E}_p \cdot \vec{P}_s dV_s \quad (1)$$

where $E_s$ is the electric field at the probe 120 produced by the sample 110, $P_p$ is the induced probe polarization density under excitation at $\omega_p$, $E_p$ is the electric field at the sample 110 produced by the probe 120, and $P_s$ is the induced sample polarization density under excitation at $\omega_s$. The interaction force associated with the interaction energy H is $$\vec{F} = -\Delta H. \quad (2)$$

Under the near-field configuration, the integrals may be dominated by volumes in the sample 110 and the probe 120 extending much less than one wavelength in one or more dimensions. When the spatial extent of the interacting regions of sample 110 and probe 120 are far smaller than one wavelength, there is negligible cancellation of the force due to any difference in wavevectors of the two different excitation radiation waves. Hence, two or more excitation waves may be in any directions, including being orthogonal to each other as illustrated. The directions and polarizations of the excitation waves may be adjusted according to the geometrical dimensions and relative positions and orientations of the sample 110 and the probe 120 to enhance the induced polarizations $P_s$ and $P_p$ and their interaction.

Such optical interaction energies contribute to the potential energy relevant to the motion of an irradiated particle. For example, optical tweezers use the focal point of a laser beam to create a potential minimum which, if sufficiently deep, may trap the Brownian motion of an otherwise free particle. Gordon and Ashkin, "Motion of atoms in a radiation trap", Physical Review A 21, 1606–1617 (1980). Novotny et al., "Theory of nanometric optical tweezers", Phys. Rev. Lett. 79, 645–648 (1997), and Ashkin, "Forces of a single-beam gradient laser trap on a dielectric sphere in the ray optics regime", Method Cell Biol. 55, 1–27 (1998). In the system 100 in FIG. 1, assuming that the sample 110 is fixed at or near a surface of the holder 112 and the probe 120 is suspended by a mechanical harmonic oscillator, the potential energy function of the probe 120 determines the motion of the probe, with or without excitation waves. The optical interactions between the sample 110 and the probe 120 under optical radiation contribute to this harmonic oscillator potential and hence the motion of the harmonic oscillator can be measured to extract information about the optical interactions.

Under proper conditions, the interaction energy in Equation (1) can be expanded in powers of the displacement coordinate of the harmonic oscillator. The coefficient of the linear term represents a force or torque in the limit that the probe's oscillator coordinate is a pure translation or rotation, respectively. In magnetic resonance, this force (with magnetic polarization and E replaced by B) can be experimentally demonstrated to deflect atomic beams due to the known transverse Stern-Gerlach effect. The optical counterpart is the gradient-dipole force. For example, the phenomenon of optical tweezers uses the DC component of the force. In the DC case, a steady-state polarization is induced by a certain Fourier component of the incident field and the spatial gradient of that same Fourier component acts to push on the particle in proportion to that polarization.

Equation (1) can have AC components if the time dependence of $P_s$ includes a field at a frequency ($\omega_s$) different from the frequency ($\omega_p$) of the field responsible for the field gradient. This is the basis of proposals for ultrasensitive spectroscopy of trapped ions where the AC force is at the difference between two applied rf frequencies and is matched to one of the frequencies of the trapped ion motion. U.S. Pat. No. 4,982,088 to Weitekamp et al., and Pizarro and Weitekamp, "Magnetic resonance of trapped ions by spin-dependent cyclotron acceleration", Bull. Magn. Reson. 14, 220–223 (1992). Another technique for magnetic resonance force microscopy creates the AC force at the Larmor frequency by spin-locking the transverse magnetization in the presence of a ferromagnetic particle, which provides a static field gradient. Sidles, "Noninductive detection of single-proton magnetic-resonance", Appl. Phys. Lett. 58, 2854–2856 (1991). If either the sample or the ferromagnetic particle is bound to a cantilever with a mechanical resonance close to the Larmor frequency, its harmonic motion will be resonantly driven. Related magnetic resonance methods using time-dependent longitudinal magnetization have been demonstrated and show great promise for extending spin spectroscopies to micron scale and below. Sidles, "Magnetic-resonance force microscopy", Rev. Mod. Phys. 67, 249–265 (1995), Leakowitz et al., "Force-detected magnetic resonance without field gradients", Sol. St. Nucl. Magn. Reson. 11, 73–86 (1998) and "Force-detected magnetic resonance without field gradients", Bull. Am. Phys. Soc. 44, 543 (1999), and U.S. Pat. No. 6,100,687 issued from U.S. patent application Ser. No. 08/872,528, "Force-Detected Magnetic Resonance Independent of Field Gradients" by Weitekamp et al. Single-spin designs have been proposed based on audiofrequency nanoscale cantilevers with force sensitivity at a level of attonewton/$(Hz)^{1/2}$.

The system 100 shown in FIG. 1 can be operated in various modes. One mode is that both the sample 110 and the probe 120 are excited by excitation radiation waves of different frequencies. Another mode is that one of the sample 110 and probe 120 is under a static electric or magnetic field while the other is illuminated by an excitation radiation wave. Yet another mode is that one of the sample 110 and probe 120 has a permanent DC polarization even if no external field is applied to this permanently polarized object while the other object is applied with an external field.

The general approach in designing and operating the system 100 shown in FIG. 1 is described in the following. Since the interaction force between the sample 110 and the probe 120 is essentially symmetrical, it is understood that the terms "sample 110" and "probe 120" are interchangeable if not specifically indicated.

A material of interest is made in a suitable size and shape as the sample. This sample is to be exposed to electromagnetic or acoustic radiation, thereby developing (in steady state) an electromagnetic polarization at the frequency or frequencies of the incident radiation and/or at sums and differences of these frequencies. A frequency of the radiation in the sample will be denoted $\omega_s$. A special case is $\omega_s=0$, which is a static electric or magnetic polarization. A further special case is no irradiation, in which case the permanent (as opposed to induced) DC polarizations of the sample may be studied or fluctuations in polarization may be studied. In some embodiments, additional relevant frequencies will be those of resonances in the electromagnetic susceptibility of the sample or the induced susceptibility characteristic of the irradiated sample. The sample may be stationary or in an arbitrary state of motion. A special case is that the sample itself constitutes a part of a mechanical oscillator.

The probe mechanical oscillator may be additionally exposed to electromagnetic or acoustic irradiation so as to develop its own characteristic polarization(s) and susceptibilities. A frequency of this second irradiation and/or polarization is denoted by $\omega_p$. In the special case that the sample is part of an oscillator, then this second irradiation may be associated with the fixed (as opposed to mechanically oscillating) probe frame. This second irradiation may then exist dominantly in free space or in a stationary material object, extending outside that object as evanescent and/or propagating modes. This second irradiation may also exist predominantly in a probe mechanical oscillator, even when the sample itself also comprises part of an oscillator. The special case that $\omega_p=0$ is of interest, since DC polarizations may be large and persist without continuing input of energy.

The sample 110 and the probe 120 should be disposed relative to one another to allow the fields or vector potentials associated with the electromagnetic polarizations of the probe and sample volumes to interact. The relevant interactions include all electromagnetic phenomena, including propagating waves and evanescent waves. Oscillation of matter in the sample and probe positions and/or shape will generally be an aspect of the electromagnetic polarization and contact sample and the probe may be in contact with each other. The actual contact between the probe and the sample is not necessary, since the interaction is through fields whose useful reach extends well beyond the length scales (e.g., van der Waals radii) associated with mechanical contact. This interaction may be optimized by bringing the sample and the probe into close proximity, typically much less than the electromagnetic wavelengths of interest. The distribution of the sample and probe material can be arranged to optimize their force of interaction, given other constraints. The relative orientations of the sample and the probe and of the polarizations and momenta of the fields incident on the sample and the probe are additional geometric variables which may be used to optimize the interaction or provide information on the sample. An aspect of this interaction is the electromagnetic force which sample and probe volumes exert each upon the other in proportion to the product of the polarizations in each. Another aspect is the dissipation of the mechanical or electromagnetic oscillations of sample or probe which are enhanced by proximity of the sample and probe.

The frequencies $\omega_f$ present in the polarization-dependent forces between the sample 110 and the probe 120 are in general within the mechanical frequency response range of the oscillator. In some applications, Of may be at or near the resonance frequency of the oscillator engaged to one of the sample or probe or the resonance frequencies of the two mechanical oscillators to which the sample and probe are respectively engaged. Let $\omega_h$ be the resonance frequency of the harmonic oscillator whose detection will provide a measure of the electromagnetic interaction being probed. Then the condition of $\omega_f \approx \omega_h$ can optimally excite the oscillator amplitude in proportion to the interaction force. In addition, the system can be adjusted so that the force frequency $\omega_f$ is a harmonic of the resonance frequency $\omega_h$ of the oscillator. For example, the condition of $\omega_f \approx 2\omega_h$ can be used to parametrically amplify the pre-existing amplitude of the oscillator and/or to excite a classically-forbidden double quantum excitation of the oscillator.

In either of the above conditions, detection of the resulting change in amplitude can be analyzed through known mechanics to determine the force proportional to the sample polarization and thus to determine that polarization and/or relevant geometric relationships. Detection through the non-linear response of the oscillator and frequency shifts of the oscillator and damping of the oscillator are possible alternative means of using the favorable properties of an oscillator for force detection. This force is also usefully viewed as proportional to the gradient (with respect to the mechanical oscillator coordinate) of the field of the probe at the sample volume. A variety of modulation schemes involving the sample or the probe are possible in order to achieve the mechanical resonance condition; it is only necessary that the sum or difference between a frequency present in the polarization of the probe and one present in the sample act on the mechanical degree of freedom in a manner which can be detected.

In the case that the system of sample and probe has two or more mechanical oscillators, the resonance may be such as to couple energy and action between two (or more) oscillators. For example, if $\omega_{hs}$ and $\omega_{hp}$ are two harmonic oscillator frequencies and $\omega_f$ is the frequency of an interaction between the oscillators having a term linear in each of the oscillator coordinates, then coherent oscillatory exchange of action between the oscillators occurs at a frequency proportional to the strength of the interaction. The resonance condition at which such exchange is optimized is $\omega_f = |\omega_{hs} \pm \omega_{hp}|$.

This and other mechanisms of coupling energy and/or action between oscillators may also play a role in optimizing a set of oscillators in different ways for different purposes. For example, one oscillator may have properties optimized for being driven by interaction with a specific type of electromagnetic field (characterized by frequency, polarization, magnetic and electric amplitude, etc.), while another nearby oscillator is optimized for a particular method of detecting its mechanical properties. By transferring action between the first oscillator and the second oscillator by whatever means, the favorable properties of each are incorporated into the measurement procedure. A related use of such exchange of action is to use the controllable amplitude of one oscillator to set the amplitude of another, which might not otherwise be accessible. This can be useful in setting an initial condition of minimum uncertainty prior to coupling an oscillator to an unknown field to be measured.

In some embodiments, it may be necessary to arrange multiple instances of coupling and detection with multiple mechanical oscillators or the same oscillator successively in time. The results of these separate measurements may then be combined mathematically, for example, to form desired correlation functions. As an example, the product of two similar and simultaneous measurements with probe oscillators separated in space can be used to measure the second order correlation function of the electromagnetic quantity measured, such as the near field of an electromagnetically polarized sample of interest.

Measurements may be made by repetitively adjusting a variable to record the displacement of the oscillator or other mechanical observable as a function of the variable. Variation of frequency, amplitude, momentum, or polarization of one or more of the incident fields would provide spectroscopic information. Increment of a time variable in some sequence of irradiation of the sample will encode dynamic information such as Bohr frequencies or relaxation times in analogy to time-domain spectroscopic measurements. Variation of the relative orientation of the various fields and objects provides additional information, including polarization information.

Imaging of an extended sample can be achieved by varying the position of the probe relative to the sample. Imaging of the second-order correlation function of the electromagnetic field of the sample can be performed by repeated measurements of the product of the displacement of two probe oscillators as a function of the positions of these probes. Variation of the sample properties by a change in thermodynamic state, chemical composition, or additional prior irradiation, provides a method for recording information with high spatial and frequency resolution. Advantages of such data recording include enhancing bit density, lowering recording energy, and accelerating read and write rates due to its sensitivity to small polarizations or changes in polarization, its spatial resolution, its compactness, its convenience and its potential for massively parallel implementation.

When the system is operated at $\omega_f = |\omega_p - \omega_s|$, special operating advantages can be achieved. For example, as suggested above, constant amplitude irradiation of sample and probe volumes at frequencies which differ by approximately a resonant frequency of the mechanical oscillator will allow detection of the sample's polarization by way of the displacement of the oscillator. This illustrates the possibility of realizing forces at practical mechanical frequencies from polarizations at much higher frequencies for example optical frequencies. Since it is advantageous for $\omega_f$ to be maintained in a narrow range of frequencies in order to efficiently and reproducibly drive the mechanical oscillator, it will often be useful to generate the fields responsible for driving the polarizations in the sample and the probe from the same radiation source by modulating its output to produce excitation waves at different frequencies. Such methods have the property that the resulting force of interest can be as stable as the modulation or shift frequency and is substantially insensitive to fluctuations in the frequency of the original source. For example, an amplitude modulation of a source at $|\omega_p - \omega_s|/2$ generates sidebands with a separation of $|\omega_p - \omega_s|$ in frequency, independent of the initial spectrum. Another example is the use of diffraction by a traveling or standing wave in refractive index to both diffract and shift the frequency of an electromagnetic beam (by that of the diffracting wave), thereby providing spatially separated, but mutually coherent, beams for use in sample and probe volumes.

The frequency $\omega_h$ of the mechanical oscillator in general may be a function of temperature, of the applied fields and of its position with respect to the sample. Thus, it is desirable to have an observable whose observation can be used in a feedback loop to maintain the mechanical resonance. The derivative of the oscillator's amplitude with respect to $\omega_f$ may be used as-such an observable. This derivative is minimized at the mechanical resonance. It could be conveniently measured by modulating $\omega_f$ at a frequency $\omega_{mod}$, e.g., in a sinusoidal manner, over a range small compared to the width of the mechanical resonance and observing the sidebands at $\omega_{f0} \pm \omega_{mod}$ in the oscillator motion. Here $\omega_{f0}$ is the center of the range of modulation. These sidebands vanish only when $\omega_{f0} = \omega_h$, so the amplitude of a sideband provides the error signal in a feedback loop. Either $\omega_{f0}$ or $\omega_h$ can be adjusted to maintain the null of this error signal. The former is simply a parameter of the incident fields and can be adjusted electronically. The latter can be adjusted through the value of additional quasi-static forces on the oscillator of an elastic, optical, capacitive, or magnetic nature. For example, controlling the temperature of the oscillator may generally change its elastic force constant, providing a convenient way of varying $\omega_h$. Such feedback schemes can occur simultaneously or interspersed with the scanning of position needed for imaging or the scanning of optical frequency needed for spectroscopy.

Particularly in scanning probe embodiments of the invention, it may be desirable in certain applications to have independent control over the measurement of the distance of the probe tip from the sample surface, whose topography is generally unknown. The combination of the present method with known scanning probe methods can be used to achieve this goal. This combination could take the form of coordinating the movements of separate scanning probes for the different functions.

Alternatively, the same probe may be operated to incorporate multiple methods to perform the desired measurements. For example, atomic-force microscopy (AFM) makes use of DC displacements of cantilevers into or onto or adjacent to which the optically driven mechanical oscillator of the present FDOS invention could be placed. The contact with the sample would take place in the usual manner of the various AFM methods, while the position of the FDOS tip relative to the sample would be controlled and measured by virtue of its known (fixed) relationship to the AFM tip. Analogously FDOS could be combined with scanning tunneling microscopy, near-field scanning optical microscopy, and other scanning probe methods.

Applications using Dissipative Optical Forces

The above examples deal with the elastic part of the interaction force between the sample and the probe. However, the dissipative part of the force between the sample and the probe may also be used for measurements. This is achieved, for example, by using the rotating-frame (or dressed-state) transitions to couple high-frequency polarization in the sample to lower-frequency polarization in the probe. More specifically, a ferroelectric or paraelectric probe oscillating at $\omega_h$ can experience increased mechanical dissipation when the Rabi frequency associated with the interaction of the electromagnetic radiation in the sample with a spectroscopic transition of the sample matches the oscillator frequency $\omega_h$. This dissipation may be viewed as the result of the changing electric field of the probe at a position in the sample driving low frequency transitions of the sample that exist by virtue of the AC polarization of the sample. The analog of this process for a magnetic-dipole allowed transition and a ferromagnetic probe is another example. This is a distinct method of converting a high frequency spectroscopic interaction in the sample to a mechanically detectable interaction at $\omega_h$.

Another variant of the method that may result in detectable optically-induced dissipation of the oscillator motion involves the application of the single incident optical field on the probe, which again can be referred to by its frequency $\omega_p$. The motion of the oscillator (thermal or driven in any way) can be used to cause a modulation on the (near) field and hence can introduce Fourier components at or near $\omega_p \pm \omega_h$. The absorption of either of these sidebands by the sample involves an exchange of energy with the oscillator, as well as with the incident field. Such energy exchange could be detected by a change in its motion.

Detection of the Oscillator Motion

The harmonic displacement of the oscillators in general may be measured by a number of techniques for measuring small displacements, including but not limited, capacitive detection, optical levers, and electron tunnel sensors. It is discovered that the motion of the oscillator can also be measured by monitoring quasi-elastic scattering of light. This technique may be combined with other motion-detection techniques.

It is widely believed that picometer motions of nanoscale objects are too small to be reliably observed. Some optical measurements of displacement by quasi-elastic scattering use a mirror with an area much greater than $\lambda^2$ to specularly reflect the light in a Fabry-Perot interferometer. This relatively large area was maintained even in applications where other advantages of small size were appreciated, because it was understood to be necessary. This restriction to large areas, as needed for specular reflection, leads to oscillators with mass that is far greater than is optimal for the detection of weak forces. Much smaller nanoscale oscillators have been fabricated as components of ultrasensitive sensors, but their displacements were measured using electrons. Oscillation of carbon nanotubes has been observed by imaging the time-average trajectory with an electron microscope, a method that has the disadvantage of being insensitive to the phase of the oscillator. The carbon nanotubes with metallic particles at their tip used in these studies is one example of suitable nanoscale oscillators. Because of their robustness, small motional mass, and the demonstrated possibility of bonding other materials to them, carbon nanotubes are a particularly possibility for the oscillators and other small parts needed for the present inventions.

Phase sensitive electrical methods have been demonstrated on nanoscale oscillators that required current paths on the oscillator which are displaced by the oscillator motion. This work illustrates the existence of fabrication methods for making nanoscale semiconductor oscillators with attached metal parts, as is needed for the embodiments of the present invention. The present optical detection method is advantageous in not requiring conducting paths, thus eliminating a difficult fabrication step and reducing the oscillator damping associated with extended surface layers of conductor. In addition, the noise associated with shot noise and feedback forces for photons can be lower than that practical with electrons.

Thus the optical detection method of the present invention is generally applicable to nanoscale oscillators. At least part of the oscillator can be made from materials which scatter light effectively. For metals, this scattering can exceed that which would be estimated by extrapolation from bulk optical properties, due to the plasmon resonances of nanoscale metal particles. These resonances are used here to detect the motion of nanoscale oscillators. It includes the extension of quasi-elastic light scattering from the well-known case of harmonically bound mirrors to objects so small that they may even scatter essentially isotropically.

Such scattering is somewhat analogous to stimulated Raman scattering associated with the natural vibrational modes of molecules, which are highly anharmonic oscillators. It is an aspect of the present invention that the oscillators are engineered compositions of matter with essentially harmonic vibrations and large Raman cross sections. The physical mechanisms contributing to the large observed cross section may include the phase modulation of the scattered field by the motion of the oscillator through space, the amplitude modulation by the oscillator motion of its own optical frequency polarization through gradient fields at its location, the amplitude modulation of the optical polarization of surrounding objects by the changing field of the moving oscillator at those surrounding objects. It is also recognized that the oscillator and surrounding objects can jointly determine the frequency of plasmon or other electronic resonances and that their relative displacement by the oscillator motion will change the frequency of this resonance. If $\omega_d$ is on the slope of that resonance, then the changing frequency of the resonance will appear as an amplitude modulation, providing another mechanism of enhancing the scattering at $\omega_d \pm \omega_f$. Polarization modulation by an oscillator motion that has a torsional component can similarly be used to create such sidebands, which would be detected by using a polarizer to detect the photocurrent of one polarization component of the scattered field.

The non-specular nature of the light scattering reduces the fractional efficiency f with which the scattered light is collected. It is desirable to keep this efficiency sufficiently high that the uncertainty associated with the detection of the scattering does not become an important source of the overall noise. It is well known that lenses can be used to effectively collimate or focus light originating from a point-like source. In addition waveguides may be positioned so that a large fraction of the light of the point source enters a guide mode or modes of the waveguide. In these ways, even isotropically scattered light can be brought to the detector with adequate efficiency. This scattered light will generally contain elastically scattered light at $\omega_d$, as well as the quasi-elastically scattered light at $\omega_d \pm \omega_f$ which constitutes the optical signal. The interference of these mutually coherent waves at the detector creates a component of the photocurrent at $\omega_f$ proportional to the amplitude of the oscillator, which constitutes the electrical signal.

In general, a polarizer is advisable in the detection path, since, together with lenses, it also aids in discriminating against light that has not taken substantially the same path as that at $\omega_d \pm \omega_f$ and would thus not interfere coherently with it. Such discrimination is desirable to minimize both shot noise and the necessary dynamic range of the detection system. Another approach to minimizing the necessary dynamic range of the detection system is to use destructive interference of mutually coherent beams at $\omega_d$, one of which also contains the quasi-elastically scattered sidebands, so that in the absence of oscillator motion the photocurrent is near a null.

There are a number of applications of nanoscale oscillators that would benefit from the present highly sensitive optical method of detection. In applications such as force-detection, calorimetry, viscous damping, and measurement of the oscillator's mass (e.g. to detect binding of a molecule as additional mass) sensitivity improves as the oscillator is reduced in size and as its ring down time is lengthened. The present optical method and the oscillator design features (such as using the plasmon resonances of metal nanoparticles attached to the oscillator) enables the extension of these methods to smaller sizes and longer ring down times than would be practical with prior art detection methods of nanoscale oscillator displacements.

Applications Involving Extended Oscillators

The present techniques can also be applicable when sample and probe volumes are in close proximity over extended lengths or areas that are greater than the wavelengths of interest. Suppose that a single oscillator extends in one or two dimensions over a distance comparable to or greater than the incident wavelengths. The interaction with a similarly extended sample in its near field along the third dimension will still be constructive, so long as the inverse of the difference in wavevectors of the incident fields is small compared to the inverse of the oscillator dimension parallel to it. Thus, for example, the pixel size in force-detected optical microscopy need not be much shorter than a wavelength. Using such large oscillators could simplify fabrication. It may also increase signal-to-noise ratio for each device.

Application of Oscillator Arrays as a Nonlinear Optical Medium

The present mechanisms of driving and detecting the motion of individual oscillators are also applicable to arrays of oscillators in one, two, or three dimensions. The goal may be simultaneous imaging or spectroscopy over a line, a plane, or a volume to achieve greater throughput. As an example, a surface could be imaged by a two dimensional array of FDOS oscillators acting simultaneously. Since it may be desirable to avoid having separate detectors for each oscillator, one embodiment may use a single optical detector to collect and measure the scattered light from a group of oscillators as a composite signal. If it is possible to selectively modulate (e.g. turn off) the signal from each oscillator, then the contribution of each oscillator to the total signal may be determined by taking linear combinations of composite signals with different sets of oscillators so modulated.

An efficient strategy for obtaining and sorting out a large set of such distinct composite signals is based on the Hadamard matrices, a linearly independent set of matrices each element of which is zero (off) or one (on). The elements of these matrices are assigned in one-to-one correspondence with each oscillator. A set of measurements is made, with each oscillator turned on or off according to the corresponding element of a different Hadamard matrix. The Hadamard transform deconvolves from this signal the signal from each oscillator, with the assumption that it contributed identically in each measurement in which it was on. Thus this transformed data set is an image of the underlying surface, or more generally of the environment of the oscillators, with each oscillator contributing a pixel.

The states indicated as on and off might differ only in the distance between the probe and the sample, controlled, for example, by piezoelectric or thermal expansion of the probe dimension perpendicular to the surface. Note that, this same strategy could be used in cases where the detection did not involve an optically driven mechanical oscillator, but some other means of spectroscopy relying on near field enhancement. Both apertureless near-field scanning optical microscopy and surface-enhanced Raman spectroscopy are examples where the signal is light scattered by the surface species of interest enhanced by the presence of a nanoscale tip. Hadamard transform versions of these methods would be advantageous in extending them to linear or planar arrays of probes, thereby increasing sensitivity and throughput, while retaining spatial resolution.

The set of pixels comprising the "image" of the surface might have been written as a form of data storage. The method of this writing may involve objects distinct form those used in the detection strategy. It is known that tips with nanoscale radii of curvature can be used to make nanoscale indentations in various media. The force of indentation can be mechanical or can be due to rapid thermal expansion of the tip. It is also possible (and suspected in some cases) that the enhancement of optical fields near nanoscale tips can lead to damage even without physical contact. The tip used in writing could be the same as that used as the detection probe (e.g., oscillator) or could be separately optimized for the writing process. Note that in both the writing and the reading steps, the data density (or image resolution) is not limited by the spacing of the read or write tips, but rather can be increased by moving the array relative to the substrate and repeating the read and write steps at resolvable locations.

Noting that the oscillator array plays the role of a nonlinear optical medium, analogs of various applications of nonlinear media are possible. In particular note that the overall process of FDOS can be viewed as four-wave mixing with the fourth wave being the quasi-elastic scattering. For example, in analogy to so-called coherent anti-Stokes Raman scattering, the scattered light contains the frequency $\omega_s - \omega_p + \omega_d$. Momentum matching conditions are also analogous. Thus, the overall process multiplies wavefronts. This is the basis of methods of optical computing and pattern recognition. Similarly phase conjugate mirrors might be made from this new composition of matter, arrays of mechanical oscillators (including the part of the array playing the role of "sample") with intense optical interactions and strong coupling of that interaction to the mechanical motion through engineered gradient dipole forces. The wave mixing can also be used to produce a wave-mixing signal at $|\omega_p - \omega_s| \pm \omega_p$ when the probe-sample are driven by coherent radiation waves at $\omega_s$ and $\omega_p$, with or without the detection wave at $\omega_d$. The amplitude of the wave-mixing signal is essentially proportional to the amplitude of the mechanical motion of the oscillator.

Holography is another way in which information can be written and read from areas or volumes of nonlinear media with dimensions much greater than the optical wavelength. Since the present oscillators are optically driven and read, any such scheme is adaptable to them. For example, the write step could entail mechanical damage done to a substrate that is contacted only when the oscillator at that position is strongly driven. This driving can be made to depend on position by using interfering waves of different wavevectors at each of the frequencies $\omega_p$ and $\omega_s$ that drive the oscillator. Many optical writing schemes are also relevant in combination with FDOS as the read method.

Reading permanently-stored data with FDOS can be subdivided into two steps which may take place sequentially or coincidently in time. The first step is to transfer the written information to the oscillator motion in preparation for reading. This transfer step would take advantage of the difference in oscillator amplitude that results from the change in state of the substrate done by the write step with the substrate near each oscillator serving as the "sample". By using sufficiently low power or different wavelengths than in the write step, the transfer step could be made substantially nondestructive. The second step, which may occur simultaneously or subsequently to the transfer step, is to scatter light off the driven oscillator array to read the information. Each step benefits from the well-known holographic strategies. In particular, information can be written to or read from different stored grating vectors simultaneously due to the inequivalence of different directions of the incident and scattered light. Also inhomogeneous broadening of the spectroscopic transitions and photochemical or nonphotochemical hole burning can be exploited by using different frequencies to write and read different subsets of molecules or crystal sites, thereby increasing data density and throughput.

The mechanical nature of the oscillator array allows induced shifts of $\omega_h$ to also play the role of storing information. For example, if the oscillator and its support contained magnetic material, then changing the magnitude or relative direction of their magnetic moments would change the magnetic contribution to the oscillator restoring force and shift $\omega_h$. Alternatively, the change in this frequency with the approach of a magnetic body could provide the information on the magnetic moment of the oscillator or the other body. Methods for writing such magnetic bits are highly developed and include magnetic write heads and optically induced temperature changes. The present method provides a new way of reading these changes and does not rely on directly measuring the magnetic field per se. The optical aspect of the reading, including holographic versions, could provide advantages.

The application of the present techniques includes special cases where the relevant mechanical degrees of freedom are overdamped, so that no well-defined oscillator frequency is definable. For example, the mechanical response of molecules can involve translations against viscous forces. The attractive interaction between a molecule and an irradiated nanoparticle has applications in the separation technology. See, e.g., Novotny et al., "Theory of nanometric optical tweezers", Phys. Rev. Lett. 79, 645–648 (1997). One key idea is that the attractive potential between a dissolved molecule and the near field of stationary irradiated nanostructures will impede the flow of the former past the latter. An analogy is affinity chromatography, where the forces are those of weak, transient chemical bonds. Here the forces applied could have the specificity of spectroscopic signatures, so they will allow separations that might not be practical on the basis of other properties. Unlike some other separation techniques using light fields to create translational forces on molecules and particles, this embodiment of the present separation technique uses the differences in the polarization between fixed and mobile phases and/or the use of evanescent fields. In particular, the use of evanescent fields increases the magnitudes of the interaction forces to a practical range for separation in fluids, where the frequent collisions and relatively high temperature impede long-term trapping or acceleration by optical forces.

Another example is the case of mechanical oscillators, each comparable to or small compared with the wavelength of a relevant electromagnetic mode and grouped together in an array extending in one or more dimensions over a distance that is comparable or large compared to one wavelength of the radiation waves. The positions of the oscillators may then be chosen so as to interact constructively with one or more electromagnetic modes. An analogy is to the use of layering of materials of different refractive index to create gratings, lenses, holograms, and related arrays which scatter light in a desired fashion. The oscillators of the present invention, together with the nearby "sample" material may similarly be arrayed in a systematic fashion to make analogous use of their novel optical properties. In particular, it is the nonlinear refractive index that is enhanced.

As an example, the exchange of energy between two optical frequency modes would be enhanced when a wavevector of the distribution of amplitude of the mechanical oscillators matches the difference in wavevectors of the electromagnetic modes in question. For example, the two optical modes in question could be surface plasmons localized in the same or opposite surfaces of a plane containing the (ferroelectric) oscillators.

In addition to building in such a difference wavevector, it could be optically-induced in an array of oscillators and samples, whose distribution of positions may be arbitrary. The difference of the wavevectors of the two incident waves whose difference frequency is resonant with the oscillator becomes the wavevector describing the variation in the phase of the oscillator motion as a function of position in the array. Such an arrangement would allow the state of motion of the array of oscillators to be set and read out in analogy to stimulated Raman spectroscopy of molecular vibrations or crystal phonons, but with the artificial mechanical oscillators replacing the naturally occurring oscillators of a particular material. This method of addressing an array can be utilized to allow massively parallel implementation of any of the applications described herein in terms of individual oscillators or small localized groups of oscillators. Variation of the k vectors coupled by the mechanical oscillators would allow different linear combinations of the oscillator amplitudes to be set and/or probed.

Figure 3:
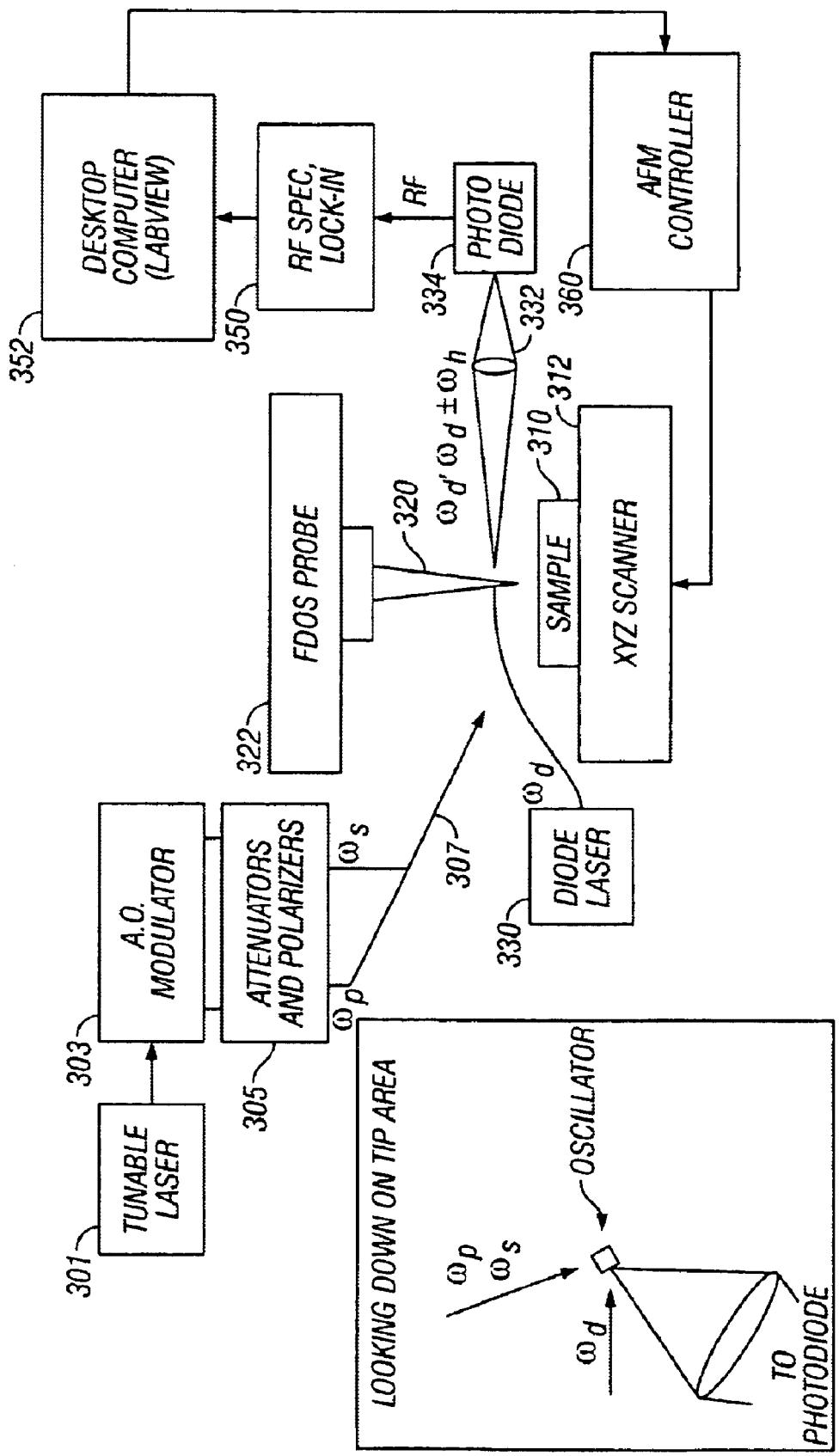
FIG. 3 shows one implementation of the system shown in FIG. 1.

FIG. 3 shows one implementation of the system 100 shown in FIG. 1. A sample 310 is placed on a XYZ-scanner 312 under a control of a control module 360. A probe 320 is engaged to a mechanical oscillator 322. A single radiation source 301, e.g., a tunable laser, is used to generate the sample and probe excitation waves. A frequency-shifting device 303, e.g., an acousto-optical modulator, is used to modulate the output laser from the laser 301 to produce a sample excitation wave at $\omega_s$ and a probe excitation wave at $\omega_p$. The amplitude and polarization of each excitation wave can be independently controlled by using a control optical module 305 with attenuators and polarizers before being combined as a beam 307 to illuminate the sample and the probe. The AO modulator can operate in the frequency range from about 100 MHz to about 600 MHz of the mechanical oscillator 322 so that the difference between $\omega_s$ and $\omega_p$ is within the response range of the oscillator 322.

The displacement of the probe 320 due to the sample-probe interaction can be measured by a non-invasive technique based on measurement of the scattering by the probe 302 of a detection wave at a frequency $\omega_d$. A laser 330 may be positioned to produce the detection wave. The scattered detection wave from the probe 320 is collected by a lens system 322 and received by a photodetector 334. A RF spectrometer 350 and a computer 352 are used to process the detected photocurrent. The interference between elastic and quasi-elastic scattered light is detected to extract the phase change due to the motion of the probe 320 to produce a photocurrent at the oscillating frequency $\omega_h$ of the oscillator 322. This is conceptually related to the observation of harmonic oscillator probes in AFM and force-detected magnetic resonance, where the Brownian motion limit (down to $\sim$pm/(Hz)$^{1/2}$) has been reached for audiofrequency oscillators ranging from $\mu$m to micron width. Rugar et al., "Improved fiber-optic interferometer for atomic force microscopy", Appl. Phys. Lett. 55, 2588–2590 (1989) and Walters et al., "Elastic strain of freely suspended single-wall carbon nanotube ropes", Appl. Phys. Lett. 74, 3803–3805 (1999).

In the present embodiment, the far field light at frequencies $\omega_d \pm \omega_h$, may be viewed as coherent (or stimulated) Raman scattering, the nanoscale analog of reflection from an oscillating mirror. The amplitude of the field at these sideband frequencies is due to the motional modulation of the phase, polarization and/or amplitude of the coherently driven dipole at $\omega_d$. Proper selection of the design parameters can make the photon shot noise small compared to Brownian motion at room temperature. The other quantum noise source associated with the scattering is the back action on the oscillator of the uncertainty of the change in photon momentum. These photon pressure fluctuations are a negligible noise contribution relative to both Brownian motion and shot noise for the range of design parameters.

The operating frequency range of 100–600 MHz of this embodiment is high enough that room-temperature thermal displacements and driven displacements are a small fraction of the oscillator dimensions, thus ensuring harmonic motion without the need for cooling or feedback. Meanwhile, these frequencies are also low enough that these displacements are optically detectable.

The polarizations at frequencies other than $\omega_s$ and $\omega_p$ generally do not interfere with the detection. Cross terms between polarization components at identical frequencies in sample and probe produce a DC force on the oscillator and forces at the sum of the optical frequencies. The DC force gives rise to a displacement of the oscillator that is smaller than the resonant signal by a factor equal to the mechanical quality factor of the oscillator, $Q_h = \tau_h/\omega_h$, where $\tau_h$ is the decay time for free oscillation. This shift of the oscillator's equilibrium position will be vastly smaller than the resonant displacements of interest, since by design $Q_h \gg 1$. Sum-frequency forces are even less effective at disturbing the oscillator, since they are vastly higher than any mechanical frequency.

In general, sources of radiation at $\omega_s$ could in principle drive the probe oscillator through its polarization, even in the absence of the targeted feature of the sample. This creates a background analogous to that in many coherent spectroscopic measurements of condensed matter. However, the present technique allows for the reduction of the effects of this background contribution because the background driving essentially vanishes for a plane wave and, more generally, whenever the net effect of sources other than the target feature create no gradient along the harmonic oscillator coordinate at the probe position. For example, as shown in FIG. 2, the harmonic oscillator coordinate can be chosen to be in a plane parallel to that of the substrate, making it insensitive to the larger gradients normal to the substrate. Similarly, the signal torque on a torsional oscillator can be made proportional to a field component which is orthogonal to the background fields, but which appears in the field due to a nearby point dipole. When a probe-oscillator system is designed to have two or more fundamental modes, these multiple modes provide distinct information at a given probe-to-sample coordinate and may be resolved by their separate frequencies.

The driven oscillator displacement is to a good approximation a linear response to the near-resonant force. At a particular frequency that response can be decomposed into components that are in-phase or 90 degrees out of phase with a reference wave at that frequency. Alternatively, the oscillator amplitude can be viewed as a complex number whose real and imaginary parts are these two distinct components. Signal proportional to these two components are simultaneously available by standard methods of phase sensitive detection of the electrical signal in the detection module 103 proportional to the oscillator amplitude.

This is a convenient viewpoint from which to discuss interference effects between the various sources of such forces. For example, the complex signal as a function of the scanned frequency $\omega_s$ in a spectroscopic application will reveal the complex lineshape which is understood from existing theory to characterize the complex susceptibility associated with the pairs of levels connected by that scanned incident field. Interference effects between simultaneously contributing parts of the sample have, in addition to these well known spectroscopic phase relationships, geometric information, since the phase of the force from each sample element depends also on its position relative to the probe.

Scanning of the probe over the sample reveals the image at the "color" of the frequency $\omega_s$. Combining observations from different normal modes of the probe coupled to the oscillator, distinguished by $\omega_h$, or from different probe geometries, provides the phase and direction of the target's optical response at each $\omega_s$ and each resolvable pixel, the size of which will be at least as small as existing NSOM methods. When a probe-oscillator system is designed to have two nominally degenerate fundamental modes, that in practice will be split in frequency by any (intentional) asymmetry, thus providing distinct information at a given probe-to-sample coordinate.

Cases may arise where background signals, due for example to substrate roughness, create a dynamic range problem if large compared to the single-molecule signal of interest. Such background can be further mitigated by using frequency modulation strategies developed in absorption spectroscopy. For example, if the frequency of the common source from which $\omega_s$ and $\omega_p$ are generated is modulated at $\omega_m$ so that $\omega_s$ sweeps cyclically over a fraction of the spectroscopic line of interest, then the contribution to the force from the sample, but not from the background effect, is substantially moved to $|\omega_p - \omega_s| \pm \omega_m$, one of which sidebands can be tuned to $\omega_h$. Then the force measured is proportional to the slope with respect to frequency of the linear optical response. Scanning the center frequency of the common source gives the derivative mode spectrum of this response, suppressing the background component. Note that even if the probe were fixed or its amplitude of vibration was not substantially driven by interaction with the sample, the use of such frequency modulation scheme would be valuable in creating sidebands on the elastically scattered light. This could be described as the combination of frequency modulation absorption spectroscopy and apertureless near field scanning optical microscopy. This apparently novel experiment, though logically distinct from FDOS, could be performed with a subset of the apparatus described and is a distinct aspect of the present invention.

For each implementation of the present technique using frequency modulation of the incident light, there is an analogous one using polarization modulation. Because the induced optical polarization of matter depends on the inner product of the transition dipole and the polarization vector of the incident light, the modulation of that polarization vector modulates the source of the near and far fields of interest adding sidebands at multiples of the modulation frequency. The polarization vector of the incident light can be described by a three-component vector including the possibilities of linear and circular polarization and various admixtures. Appropriate polarization modulation schemes, in the context of the present inventions, would then provide novel methods for measuring, for example, linear and circular dichroism.

Another possible class of resonant mechanical displacements could come from a difference frequency polarization of the probe proportional to its second order nonlinear optical susceptibility and the amplitude of the two incident optical fields. The interaction of this moment with a hypothetical local DC electric field gradient across the oscillator could drive it in the absence of a sample. This may be readily avoided by minimizing the second-order optical susceptibility by choice of materials (it is zero in centrosymmetric objects) or minimizing the resulting moment in the probe by choice of incident polarization directions. If necessary, it can be further reduced by minimizing the relevant component of the DC electric field gradient tensor across the probe region. This potential artifact could also be viewed as an opportunity; by mounting some material of interest on an oscillator and intentionally creating an electric field gradient, its second order susceptibility tensor could be measured in an easily quantified fashion. A related effect is that the presence of the two incident fields in the sample acting through the second-order susceptibility of the sample could create an electric polarization at the difference frequency with a corresponding field gradient at the probe which would create a resonant force on the oscillator in proportion to its permanent electric moment, which again is zero for centrosymmetric objects. Again, this effect is of higher order and can be minimized or intentionally exploited.

Note that even in the absence of the sample, the mode of the incident radiation field at $\omega_s$ could in principle drive the probe oscillator through its polarization. This background effect vanishes for a plane wave, since it is proportional to the spatial gradients of the field along the oscillator coordinate. Thus it is of concern only when interaction with matter has reshaped the field. Such interaction is the nature of the signal, so the concern is background signals due to the substrate that might create a dynamic range problem if large compared to the signal of interest. This problem is common to any form of spectroscopy and solutions used in other contexts are applicable here. For example, mounting molecules of interest on substrates with optical dielectric constant near unity at the wavelengths of interest will be applicable in some situations. A more general solution is to develop the analogs of various modulation and nonlinear optical methods that are used to separate the spectrum of interest from background responses which vary more slowly with frequency. For example, if the frequency of the common source from which $\omega_s$ and $\omega_p$ are generated is modulated at $\omega_m$ so that $\omega_s$ sweeps cyclically over a fraction of the spectroscopic line of interest, then the contribution to the force from the sample, but not from the background effect, is substantially moved to $|\omega_p - \omega_s| \pm \omega_m$, one of which sidebands can be tuned to $\omega_h$. Thus the force measured is proportional to the slope with respect to frequency of the linear optical response. Scanning the center frequency of the common source gives the derivative mode spectrum of this response, which has a lower fractional background component.

Other approaches to limiting the background are possible which have no analog in conventional spectroscopy, but rather are unique to force detection. For example, forces on the probe, even if resonant, will not appreciably drive the oscillator if they are orthogonal to the oscillator coordinate. Similarly, the oscillator could be designed and oriented so that torques due to target material contribute to the motion, while those due to background fields are in orthogonal directions.

The signal force can be evaluated for linear optical response of both the probe and sample. The optical near field of metallic nanoparticles has been shown as substantially consistent with the classic picture of uniform optical polarization density modeled as the collective "plasmon" response of the conduction electrons to the incident fields. A significant feature in the frequency dependence of absorption and elastic scattering cross sections are shape and size dependent resonances. Inhomogeneity of particle size and shape broaden the resonances observed on ensembles. This limits the peak response, that is possible only for a sufficiently homogeneous ensemble or a single particle. Single particle studies are needed both for incisive comparison of experiment and theory and to find, for example by combinatorial synthesis, the recipe for a particle with a narrow resonance at a particular frequency. The rf/optical spectrometer proposed will have the bandwidth to simultaneously observe many oscillators at once, for high throughput searches. Such oscillators may be thermally driven. Both the fabrication and optical detection methods proposed are aimed at this problem, which is central to the use of both metallic and semiconductor nanoparticles in any optical application. In the examples, the near fields at $\omega_p$ are not assumed to be at the plasmon resonance, and so a relatively flat spectrometer response will apply over much of the potential FDOS spectrum. Using such resonances may enhance the sensitivity about another order of magnitude, assuming accepted values of plasmon damping. Note that FDOS is itself the highest sensitivity way to experimentally explore the dependence of these resonances on the material composition, surfaces, and particle shapes.

The steady-state response to the optical Bloch equations for an individual spectroscopic transition is used to model its contribution to the signal dipole $<\mu_s>$. The resonant force on the oscillator is obtained by taking the derivative of the interaction energy H according to Equation (2) with respect to the oscillator coordinate. In the limit of a point dipole sample polarization, (e.g. a single chromophore), the force is $<\mu_s>G_{psh}$, where $G_{psh}$ is the derivative with respect to the oscillator coordinate of that component of the near field of the probe at $\omega_p$ which is in the direction of the transition dipole. In the single-molecule examples, it is evaluated at the location of a chromophore 3 nm from the probe tip surface. The expectation value $<\mu_s>$ can be driven to about 0.1 of the transition's dipole matrix element at the point when nonlinearity and power broadening of the response becomes appreciable. This corresponds to an average fractional excited state population of $2.5 \times 10^{-3}$. An incident intensity of 50 W/(mm)$^2$ incident on a typical transition dipole of 1 debye (=$10^{-18}$ esu cm=$3 \times 10^{-30}$ C m) will allow a 0.1 debye steady-state signal if the off-diagonal relaxation time T2 is at least 500 fs. Thus, a wide variety of electronic, vibronic, and vibrational transitions in room-temperature solids will give optimized signals. This assumes a geometry shown in FIG. 2 in which there is no near field enhancement of the field at $\omega_s$. Employing such enhancement could extend this optimum response to shorter T2 at the same incident power, or allow lower incident power at $\omega_s$. For example, the sample molecules could themselves be mounted on metallic nanoparticles to achieve such enhancement.

The potential for sensitivity to individual molecules enables additional applications where the probe tip itself would feature a chromophore molecule. This molecule would play the role of the sample in the previous discussions. The information of interest would be the environment of this molecule which would be altered by scanning the position of the probe relative to surfaces or other objects. A great variety of phenomena could be probed at molecular length scales in this way, since the spectroscopy of the molecule at the tip and its location relative to the probe would be sensitive to electric and magnetic fields and to bonding interactions with nearby molecules. This strategy, where the nominal "sample" is a static part of the probe structure, also figures in many of those embodiments described herein where arrays of such oscillators are used. In particular the use of metallic and semiconductor nanostructures, often called quantum dots, as both probe and sample will lead to particularly strong optically induced forces and thus to favorable sensitivity to small environmental effects.

The 0.1 debye signal used in the calculation need not arise from a single molecular transition, but could also be the integrated polarization of a weak or weakly driven transition over the effectively sampled volume of some cubic nanometers. For transition dipoles perpendicular to the local direction of $E(\omega_p)$, the probe frequency $\omega_p$ may overlap with the target absorption spectrum and yet $P_s$ at that locus will be controlled by the amplitude, polarization and frequency of $E(\omega_s)$ alone. Complete imaging models all fitting the signals as a function of incident polarizations, transition dipole orientation, probe geometry and probe position will be developed under the proposal.

A similar 50 mW/(mm)$^2$ maximum intensity will be assumed at $\omega_p$. This condition will cause negligible (<1 degree) heating of the Au/Si oscillator in the room-temperature designs proposed, so long as the material supporting the oscillator has a heat conductivity comparable to Si and does not itself heat appreciably. This can be ensured by keeping the wavelengths which are incident on any Si of micron thickness above about 1100 nm or reducing the power when it is desired to work toward the blue. Since the latter approach would reduce the signal at shorter wavelengths, a preferable design for the visible region is to keep all the Si in the irradiated region as thin as possible and in contact, except along the length of the oscillator, with a transparent substrate with good heat conductivity. Methods of FDOS oscillator fabrication which achieve this construction, e.g., by putting nanoscale Si or carbon nanotube oscillators on high bandgap materials are possible. For example, CaF2 is transparent well into the UV and is lattice matched to Si within 1% at room temperature. Methods for growing carbon nanotubes at defined positions have been described and these are currently used as AFM probe tips. Another possibility is to make the beams themselves from high bandgap materials. Another possible approach to lowering the incident power at $\omega_p$ and/or $\omega_s$ is by incorporating additional metallic nanostructures so that the high intensity regions of both fields are localized near the sample and probe.

For a signal originating from a volume smaller than a few cubic nanometers, the integral over the sample volumes in Equation (1) can be replaced by this volume element with induced optical dipole $<\mu_s>$. The corresponding gradient dipole force acting between sample and probe is then found by multiplying $<\mu_s>$ by the gradient $G_{phs}$ (along the mechanical coordinate) of that near field component of the oscillating probe which is in the direction of the transition dipole. The principal noise force will be that due to the Brownian motion of the probe harmonic oscillator. Dividing that noise force into the gradient dipole force gives the FDOS signal-to-noise ratio for measurement time $t_m$ as $$SNR = <\mu_s> G_{phs} (\tau_h \tau_m / 2mk_B T)^{1/2} \qquad (3)$$

where $\tau_h = Q_h/\omega_h$ is the decay time of the oscillator with motional mass m. Little is known about the intrinsic $\tau_h$ of Si nano-oscillators at rf frequencies, since the only measurements have been after metallization along the entire length of the oscillator, which certainly decreases $\tau_h$, possibly drastically for structures of the size of interest. At audio frequencies, $\tau_h > 1$ s is observed at room temperature for pure Si cantilevers of thickness (60 nm) comparable to those proposed here. In the examples, we conservatively use $\tau_h = 10^{-4}$ s. One of the first applications of FDOS will be to measure this value. It is important to note that the force sensitivity of rf oscillators is nearly the same as audiofrequency cantilevers, since the lower $\tau_h$ of the former is compensated by their lower mass. Thus the proposed designs, with metal only over a small fraction of the length, have good prospects of being the highest sensitivity design.

The Brownian motion of the mechanical oscillator can contribute to the noise when measuring the coherently-driven contribution to the oscillators displacement. Its minimization is of interest. This motivates the application of any known method of cooling to the oscillator and also the thermal isolation of the oscillator from the sample, if it is to be maintained at a different temperature. Such a barrier would also allow a fluid to surround the sample, while allowing a vacuum at the oscillator, ideally low enough that energy loss to the residual gas is a negligible source of oscillator damping. While in some applications a solid barrier may be practical between the sample and the oscillator, the improvement of the present method's sensitivity by close approach of the sample and oscillators encourages the use of geometries in which only vacuum (or a low viscosity fluid) separates the sample and oscillator. Minimizing the motional mass of the oscillator (or moment of inertia for torsional oscillators) and maximizing the mechanical ring-down time are other design strategies for mitigating the effect of Brownian noise on the signal-to-noise ratio. Crystalline silicon and carbon nanotubes are examples of possible materials to form the beam elements of the mechanical oscillators and methods of fabrication are known for their suspension and for adding (metallic) tip material to them.

Since heat will be deposited both in the sample and in the oscillator by the driving fields, a practical design must include thermal conduction to a heat sink to hold the temperature increase of each to within acceptable limits. A temperature rise is acceptable if it does not lead to sudden destruction of the device or sample or to uselessly low signal-to-noise ratio. The need to limit heating motivates the use of materials for the oscillator beam and for the support of oscillator and/or sample that have little absorption at the incident wavelengths. In this way the heating is confined to small thicknesses in contact with support material that can serve as a heat sink. High thermal conductivity is thus a second desirable characteristic. Crystalline materials such as diamond and calcium fluoride, for example, have the dual properties of high thermal conductivity and transparency to most wavelengths of spectroscopic interest.

A number of embodiments of the invention have been described. Nevertheless, it will be understood that various modifications and enhancements may be made without departing from the following claims.

What is claimed is:

1. A system, comprising:
   a probe module, having a probe responsive to a probe excitation field at a probe polarization frequency to produce a probe polarization and an optical source to produce a first optical beam directed at said probe to produce said probe polarization and a second optical beam directed to a sample to excite a sample polarization at a sample polarization frequency;
   a sample holder holding the sample;
   mechanical oscillator engaged to one of said probe and said sample holder to move in response to an interaction between said probe polarization and said sample polarization, wherein said probe polarization frequency and said sample polarization frequency are different from each other by an amount within a frequency response range of said mechanical oscillator; and
   a detection module to measure a response of said mechanical oscillator to produce a signal indicative of a property of the sample.

2. The system as in claim 1, wherein the detection module includes a detecting device that measures a displacement of said mechanical oscillator.

3. The system as in claim 2, wherein said detecting device includes a light source to produce a detection optical wave to illuminate at least a portion of said mechanical oscillator, a photodetector to receive scattered detection wave.

4. The system as in claim 1, wherein said amount is equal to or near a fundamental resonant frequency of said mechanical oscillator.

5. The system as in claim 1, wherein said amount is equal to or near a harmonic frequency of said mechanical oscillator.

6. The system as in claim 1, wherein said probe module includes a laser to produce a laser beam from which said first and said second optical beam are derived.

7. The system as in claim 6, wherein said probe module includes an acousto-optic modulator which modulates said laser beam to produce said first and said second optical beams at different optical frequencies.

8. The system as in claim 1, wherein a polarization of the output is modulated.

9. The system as in claim 1, further comprising a feedback loop to maintain said mechanical oscillator at a resonance condition.

10. The system as in claim 1, wherein said probe module includes at least another probe.

11. The system as in claim 1, further comprising a spacing monitor mechanism to monitor a spacing between said probe and said sample.

12. The system as in claim 1, wherein said probe is spaced from the sample by less than one wavelength of radiation from the probe excitation field.

13. The system as in claim 1, wherein said mechanical oscillator has a dimension less than one wavelength of radiation from the probe excitation field.

14. The system as in claim 1, wherein said mechanical oscillator has a dimension greater than one wavelength of radiation from said first optical beam and wherein the inverse of a wavevector difference of said first and said second optical beams lees than the inverse of a dimension of said mechanical oscillator.

15. A system, comprising:
   a radiation source to produce at least a probe excitation wave at a probe frequency and another excitation wave at a frequency different from said probe frequency but coherent with said probe excitation wave to produce an interference field;
   a probe having an array of mechanical oscillators to receive said probe excitation wave and said interference field, each mechanical oscillator responsive to said probe excitation wave to produce a probe polarization and said array of mechanical oscillators responsive to said interference field to produce polarizations representative of said interference field;
   a sample holder to hold a sample with a sample polarization in a proximity of said probe to expose the sample to fields produced by said probe polarizations so as to cause motion of said mechanical oscillators from interaction between the probe polarization and the sample polarization; and
   a detector module to measure movements of said mechanical oscillators.

16. The system as in claim 15, further comprising a detection radiation source to produce a detection radiation wave to illuminate said mechanical oscillators, wherein said detector module collects and measures scattered detection radiation wave to determine movements of said mechanical oscillators.

17. The system as in claim 15, further comprising a mechanism to turn on and off said mechanical oscillators individually.

18. The system as in claim 17, wherein said mechanical oscillators are turned on and off individually according to a Hadamard matrix.

19. The system as in claim 15, wherein said sample holder is movable to shift said sample relative to said probe.

20. The system as in claim 15, said mechanical oscillators are modulated to write information in the sample.

21. The system as in claim 15, said mechanical oscillators are operated to retrieve information recorded in the sample.

22. A method, comprising:
   producing a probe polarization by exposing a probe formed of a polarizable material to a probe excitation field of a probe radiation wave at a probe frequency;
   using a sample radiation wave at a sample frequency different from said probe frequency to interact with a sample and to produce a sample polarization, wherein the sample radiation wave and the probe radiation wave are coherent to each other;
   placing said sample with said sample polarization in a field of said probe polarization to effectuate an interaction between the probe and the sample;
   engaging a mechanical oscillator to at least one of said probe and said sample, wherein said mechanical oscillator moves in response to said interaction, wherein the difference between said probe frequency and said sample frequency is equal to or near a resonance frequency of said mechanical oscillator; and
   detecting motion of said mechanical oscillator to measure a property of said sample.

23. The method as in claim 22, further comprising exposing said sample to a sample excitation field to produce said sample polarization.

24. The method as in claim 22, wherein the difference between said probe frequency and said sample frequency is equal to or near a harmonic frequency of a resonance frequency of said mechanical oscillator.

25. The method as in claim 24, wherein said harmonic frequency is a second harmonic of the resonance frequency.

26. The method as in claim 22, further comprising using another electromagnetic polarization, different from said sample polarization and said probe polarization, to affect the motion of said mechanical oscillator.

27. The method as in claim 22, further comprising illuminating said mechanical oscillator with a detection radiation wave at a detection frequency and detecting a scattered detection radiation wave whose frequency is shifted from said detection frequency due to the sample and probe interaction.

28. The method as in claim 22, further comprising scanning said probe and said sample relative to each other to obtain an image of said sample.

29. The method as in claim 22, further comprising modulating a polarization or said probe frequency of said probe radiation wave.

30. The method as in claim 22, wherein said probe includes a tip which is less than one wavelength of said probe radiation wave to allow evanescent coupling.

31. The method as in claim 22, further comprising:
    detecting motion of said mechanical oscillator to measure a property of said sample at a first time;
    detecting motion of said mechanical oscillator to measure the property at a second time; and
    correlating measurements from said first and said second times to determine the property.

32. The method as in claim 22, wherein said mechanical oscillator is engaged to said probe, and further comprising:
    engaging a second probe to a second mechanical oscillator to measure the property of said sample; and
    correlating measurements from said probe and said second probe to determine the property.

33. The method as in claim 32, wherein said measurements from said probe and said second probe are performed at different times.

34. The method as in claim 32, wherein said measurements from said probe and said second probe are performed at the same time.

35. The method as in claim 22, further comprising measuring the property of said sample a plurality of times when a parameter associated with excitation of said probe or sample is adjusted to have different values.

36. The method as in claim 22, wherein said interaction between said sample and said probe includes a dissipative interaction.

* * * * *